US008473543B2

(12) United States Patent
Tsofi et al.

(10) Patent No.: US 8,473,543 B2
(45) Date of Patent: Jun. 25, 2013

(54) AUTOMATIC CONFLICT RESOLUTION WHEN SYNCHRONIZING DATA OBJECTS BETWEEN TWO OR MORE DEVICES

(75) Inventors: Chen Tsofi, Rishon le Tzion (IL); Dov Sheinker, Herzeliya (IL)

(73) Assignee: Microsoft Corporation, Redmond, WA (US)

( * ) Notice: Subject to any disclaimer, the term of this patent is extended or adjusted under 35 U.S.C. 154(b) by 998 days.

(21) Appl. No.: 12/497,844

(22) Filed: Jul. 6, 2009

(65) Prior Publication Data

US 2011/0004702 A1 Jan. 6, 2011

(51) Int. Cl.
*G06F 13/00* (2006.01)

(52) U.S. Cl.
USPC ............................. 709/202; 709/248; 707/610

(58) Field of Classification Search
USPC ................. 709/201, 202, 203, 217, 219, 223, 709/224, 250, 248; 707/609, 610, 626
See application file for complete search history.

(56) References Cited

U.S. PATENT DOCUMENTS

| | | | |
|---|---|---|---|
| 6,393,434 B1 | 5/2002 | Huang et al. | |
| 6,983,293 B2* | 1/2006 | Wang | 1/1 |
| 6,993,522 B2 | 1/2006 | Chen et al. | |
| 7,441,049 B2* | 10/2008 | Chasman et al. | 709/248 |
| 7,512,638 B2 | 3/2009 | Jhaveri et al. | |
| 2001/0014893 A1* | 8/2001 | Boothby | 707/201 |
| 2003/0055825 A1 | 3/2003 | Chen et al. | |
| 2003/0220966 A1 | 11/2003 | Hepper et al. | |
| 2005/0027755 A1 | 2/2005 | Shah et al. | |
| 2005/0223117 A1 | 10/2005 | Terry et al. | |
| 2006/0106879 A1* | 5/2006 | Zondervan et al. | 707/200 |
| 2006/0190500 A1 | 8/2006 | Rao et al. | |
| 2006/0224620 A1 | 10/2006 | Silverman et al. | |
| 2006/0235898 A1 | 10/2006 | Loveland | |
| 2006/0242204 A1 | 10/2006 | Karas et al. | |
| 2007/0162517 A1 | 7/2007 | Teegan et al. | |
| 2007/0169015 A1 | 7/2007 | Seelig et al. | |
| 2008/0098042 A1* | 4/2008 | Tian et al. | 707/201 |
| 2008/0104206 A1 | 5/2008 | Novik et al. | |
| 2008/0155123 A1 | 6/2008 | Hall et al. | |
| 2008/0267221 A1 | 10/2008 | Ozzie et al. | |
| 2008/0320055 A1 | 12/2008 | Sagar et al. | |
| 2009/0006529 A1 | 1/2009 | Singh et al. | |
| 2009/0083210 A1 | 3/2009 | Clark et al. | |
| 2009/0125571 A1 | 5/2009 | Kiilerich et al. | |

OTHER PUBLICATIONS

"Handling Data Synchronization Conflicts", Retrieved May 15, 2009 at <<http://livedocs.adobe.com/livecycle/es/sdkHelp/programmer/lcds/wwhelp/wwhimpl/common/html/wwhelp.htm?context=LiveDocs_Parts&file=data_manage_4.html>>, 2 Pages.

"Synchronization Conflict Resolution", Retrieved May 15, 2009 at <<http://publib.boulder.ibm.com/infocenter/iwedhelp/v6r0/index.jsp?topic=/com.ibm.db2e.doc/dbessc0206.html>>, 2 Pages.

* cited by examiner

*Primary Examiner* — Viet Vu
(74) *Attorney, Agent, or Firm* — Chin IP, PLLC; Davin Chin

(57) ABSTRACT

A method and apparatus is for implementing a conflict resolution policy. The method includes providing a rule set that includes a plurality of rules that define the conflict resolution policy. An algorithm is generated by decomposing each rule in the rule set into at least one pre-action that is to be performed on data in identified fields in first and second conflicting objects, at least one condition that is to be applied to the first and second conflicting objects, and at least one action that is to be performed on the identified fields in the first and second conflicting objects if the at least one condition is satisfied. The algorithm is loaded from a configuration file for execution during a synchronization component runtime using first and second conflicting objects provided by the synchronization component.

14 Claims, 5 Drawing Sheets

| CONTEXT OBJECT | START RESULT | PHONE RESOLUTION RULES | | NAME RESOLUTION RULES | | END RESULT |
| --- | --- | --- | --- | --- | --- | --- |
| | | 1.a | 1.b | 2.a | 2.b | |
| | 'JOHN', 'DOE', '212-123-4567' | 'JOHN', 'DOE', '212-123-4567' | 'JOHN', 'DOE', '+1-212-123-4567' | 'JOHN', 'DOE', '+1-212-123-4567' | 'JOHN', 'DOE', '+1-212-123-4567' | 'JOHN', 'DOE', '+1-212-123-4567' |
| RESOLUTION FOR FIRST NAME | UNRESOLVED | UN-RESOLVED | UN-RESOLVED | A WINS | A WINS | A WINS |
| RESOLUTION FOR LAST NAME | UNRESOLVED | UN-RESOLVED | UN-RESOLVED | A WINS | A WINS | A WINS |
| RESOLUTION FOR PHONE | UNRESOLVED | UN-RESOLVED | B WINS | B WINS | B WINS | B WINS |
| NOTES | THE DATA OF PERSON A WAS CHOSEN AS THE STARTING RESULT OF RESOLUTION. THE COMPARISONS ARE ALWAYS DONE BETWEEN THE CONTEXT OBJECT AND SIDE B. | THE PHONES DIFFER ON MORE THAN JUST HYPHENS, SO THE CONDITION IN RULE 1.a WAS NOT MET | | | THE LAST NAMES DON'T DIFFER ANYMORE, SO THE CONDITION IN RULE 2.b WAS NOT MET | |

FIG. 6

AUTOMATIC CONFLICT RESOLUTION WHEN SYNCHRONIZING DATA OBJECTS BETWEEN TWO OR MORE DEVICES

BACKGROUND

Individuals these days employ myriads of computer devices or systems on a regular basis. For example, individuals can have a desktop computer and/or associated file server with which they interact at work. They can also have a laptop computer for working away from the office as well as one or more desktop computers at home. Furthermore, they may have palm-top computers such as a personal digital assistant (PDA), pocket PCs, mobile phones and/or other portable devices they utilize for organizational, communication, and/or entertainment purposes. It is typically desirous for at least some data to be copied to multiple devices to enable convenient access thereto. For instance, often a user will copy files from a desktop computer or file server to a portable computer or device for use while the user is away from their office. The user may then modify or add some new files while away from the office and subsequently needs to copy these files to their desktop computer or file server when they return to the office. Similarly, users may wish to copy pictures or music from one device to another (e.g., computer to MP3 player; digital camera to computer . . . ). Still further yet, users may demand that personal preferences and contacts (e.g., address book) be maintained across all or a subset of their computers. Thus, certain files need to be synchronized across multiple computers or devices.

In its simplest form, synchronization is merely the task of causing designated information from multiple devices or systems to become the same or consistent. Typically, this means that the most up to date information associated with a data object is used to copy to a store. This process is automated by two-way, peer-to-peer, synchronization software applications. In particular, upon activation, a synchronization application can detect changes or additions to data objects on a first device and copy or replicate new and/or altered data objects to a second device communicatively coupled to the first device via, for instance, a hardwired or wireless connection. This causes the data objects on the first device to be synchronized with files on the second device. Synchronization can also be performed remotely by accessing a network having a first device such as desktop computer coupled thereto. A second device such as a second desktop computer or laptop computer can be synchronized with the first device utilizing synchronization software.

Conflicts can periodically occur during a synchronization process. For instance, if the information that is changed in the first device and the second device is associated with the same data object and occurs between synchronizations, a conflict is detected during the next synchronization session. In these situations, some systems that synchronized data objects would provide some type of user interface on the mobile device that would indicate that the conflict existed and that the conflict was with a certain object. In one example, the device user would receive a notification regarding the conflict and the user would be asked to resolve it manually. In other examples no user intervention is possible, such as when files are being synchronized on two servers, and thus conflicts need to be resolved automatically. In yet other examples a combination of both manual and automatic conflict resolution techniques are used. For instance, automatic resolution may be used with pre-established user preferences, such as when the user specifies that in any conflict the information on a particular device should prevail over all others.

Regardless of whether the conflict resolution technique that is employed is manual, automatic, or a combination thereof, it is generally created in a context specific manner that differs for different types of synchronization problems.

SUMMARY

Conflicts may arise when a synchronization engine attempts to synchronize data objects between two or more devices. In an illustrative example, given a set of conflict resolution rules, a conflict resolution policy can be implemented. An algorithm is generated from the rules by decomposing each rule into three items. First, the rule is optionally decomposed into at least one pre-action that is to be performed on data in identified fields conflicting data objects. Second, the rule is decomposed into at least one condition that is to be applied to the conflicting data objects. Third, the rule is decomposed into at least one action that is to be performed on the identified fields in the conflicting data objects if the condition(s) is satisfied. The algorithm may be stored in an executable file for execution during the synchronization engine's runtime. Alternatively, the algorithm could be stored externally, thus providing extensibility and customization.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 6 shows one example of the data flow that arises for a particular set of data objects and rules.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used in this application, the terms "component" and "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component.

One or more components may reside within a process and/or thread of execution and a component may be localized on one computer and/or distributed between two or more computers.

Figure 1:
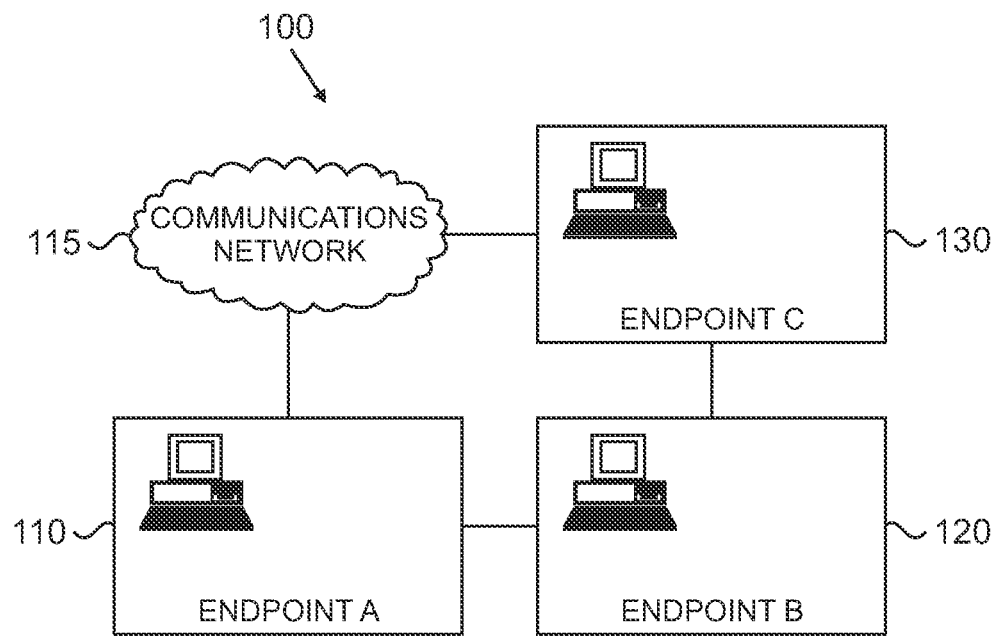
FIG. 1 shows an illustrative environment in which data may be synchronized and shared among endpoints that are in communication with one another.

Turning now to FIG. 1, shown therein is an illustrative system 100 in which data may be synchronized and shared. The system 100 contains endpoint A 110, endpoint B 120, and endpoint C 130, as well a communication network 115. This description of FIG. 1 may be made with reference to other figures. However, it should be understood that the elements described with reference to FIG. 1 are not intended to be limited to being used with the elements described with reference to other figures. In addition, while the exemplary diagram in FIG. 1 indicates particular elements, in some implementations not all of these elements may exist, and in some implementations additional elements may exist.

Generally, a sharing or synchronization relationship may exist between two or more endpoints. A particular sharing relationship may generally relate to a set of data comprising one or more data objects. When at least some kinds of changes are made to a data object, the changed information associated with the data object is synchronized to the other endpoint (or endpoints) in the synchronization relationship.

Endpoint A 110 and endpoint C 130 are shown in the system 100 as being connected by a communications network 115. Such an illustrative network should be interpreted as including any means by which data may be transmitted, including any type of network or any other kind of transfer, including the transfer of physical media, like a compact disc (CD) or flash memory drive. Endpoints might also be connected directly, such as might be illustrated, for example, by the connection between endpoint A 110 and endpoint B 120.

The information that is shared and synchronized between endpoints may be stored in a variety of manners and locations. In at least one implementation, an endpoint might store synchronized data locally on the same computing device or remotely on one or more other computing devices. Such storage may in some cases be embodied by one or more disk drives or magnetic, optical or other storage devices, or by any other electronic mechanism by which data may be stored. When some or all of the synchronized data is accessed remotely, the data may be accessed, for example, using a network or other communication means.

Each endpoint shown in this system might represent any number of general-purpose or dedicated computers, including desktop computers, server computers, laptop computers, workstation computers, mobile or cellular telephones, connected personal digital assistants (PDAs), and the like. In at least some implementations, an endpoint may be implemented by a computing environment including the illustrative computing environment discussed below with reference to FIG. 2.

Figure 2:
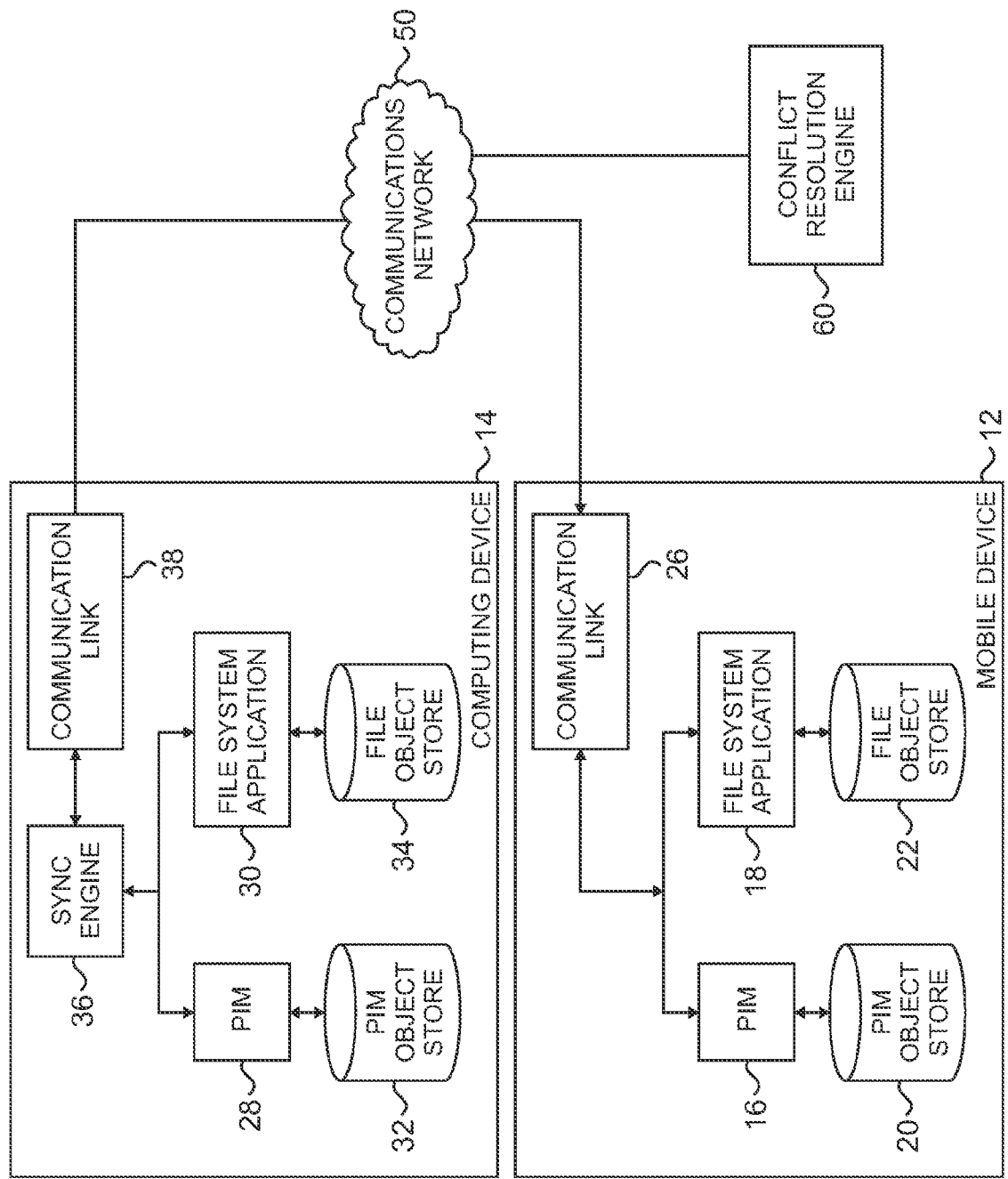
FIG. 2 is a block diagram of one example of two end points such as endpoints A and C shown in FIG. 1.

FIG. 2 is a block diagram of one example of two end points such as endpoints A and C shown in FIG. 1. In this example one endpoint is a mobile device 12 and the other endpoint is a computing device 14. Mobile device 12 includes first application program 16, second application program 18, corresponding first and second object stores 20 and 22, synchronization component (e.g., engine) 24 and communication link 26. Computing device 14 includes first and second application programs 28 and 30, corresponding first and second object stores 32 and 34, synchronization component 36 and communication link 38. It will be appreciated that both mobile device 12 and computing device 14 include a number of other components, some of which are discussed in greater detail below.

In one illustrative implementation, application programs 16 and 28 may be personal information manager (PIM) programs, which support, for example, electronic mail messaging, scheduling, calendaring, etc. Hereinafter, programs 16 and 28 will simply be referred to as PIMs 16 and 28. Of course, PIMs 16 and 28 can be configured to support a wide variety of other features, such as task lists and personalized address books, to name a few.

Data stores 20 and 32 are implemented in memory configured to store a plurality of individual data items, each comprising a plurality of fields or properties related to PIMs 16 and 28. Each data item may contain a body, metadata and attached documents. An example of data item could be an email or an entry in an address book, for instance. The metadata of a data item contains its properties and header information. The body may be the text or HTML part of the data item.

In one illustrative embodiment, PIMs 16 and 28 are programs, such as that available under the commercial designation "MICROSOFT OUTLOOK", and data stores 20 and 23 are configured to store data items, each of which has a plurality of objects or records associated with electronic mail messaging, such as a sender's name, the recipient's name, text messages, etc. Computing device 14 executes PIM 28 to maintain objects stored in store 32, and mobile device 12 executes PIM 16 to maintain objects stored in object store 20. In one illustrative embodiment, each data item in data store 20 comprises the same set of objects or records stored in data store 32, or a subset of those objects or records.

Similarly, application programs 18 and 30 maintain data items on associated data stores 22 and 34, respectively. In one illustrative embodiment, application programs 18 and 30 are file system applications, such as those available under the commercial designation "MICROSOFT WORD". It should also be noted that any suitable number of other application programs, and associated data stores, can be provided on mobile device 12 and computing device 14. However, for the sake of simplicity, only programs 16, 18, 28 and 30, and their associated data stores, are described herein.

The application programs 16 and 28 and application programs 18 and 30 shown in FIG. 2 are depicted as client-based programs. It will be understood that in other implementations one or more of the application programs may be a network-based application that resides on a server or an application that is in part client-based and in part network-based. In other words, the functionality of any or all of the applications could be provided as part of a service or as a client-resident program. For example, one of the applications may be selected from among those that are made available under the commercial designation "WINDOWS LIVE" or "MICROSOFT EXCHANGE."

In one illustrative embodiment, the user desires to synchronize data stores 20 and 32 and data stores 22 and 34. Thus, there are two instances of each data item associated with the pair of data stores 20 and 32 (one instance in object store 20 and one instance in object store 32) and two instances of each data item associated with the pair of object stores 22 and 34 (one instance in object store 22 and one instance in object store 34). When a user changes one instance of an object in a data item stored in either object store 22 or 34, the second instance of that object in the other of stores 22 and 34 is out of sync and is desirably updated the next time mobile device 12 has two-way communication with computing device 14, so that both instances of the same object contain synchronized data. The same is true for instances of objects in data items stored in data stores 20 and 32.

In order to accomplish synchronization, synchronization components 24 and 36 run on mobile device 12 and computing device 14, respectively. The synchronization components communicate with application programs 16, 18, 28 and 30 (or directly with the associated object stores) through well defined interfaces to manage communication and synchronization.

Synchronization components 24 and 36 communicate with each other through two-way communication interfaces 26 and 38. Communication interfaces 26 and 38 are illustratively commercially available communication interfaces using a suitable communications protocol. For instance, in one illustrative embodiment, mobile device 12 is connected to computing device 14 with a physical cable, which communicates using a serial communications protocol. Other communication mechanisms are also contemplated by the present invention, such as infra-red (IR) communication, direct modem communication, remote dial-up-networking communication, communication through commercially available network cards (i.e., using TCP/IP), remote access services (RAS), wireless modem, wireless cellular digital packet data (CDPD), or other suitable communication mechanisms. Communication interfaces 26 and 38 communicate with one another over communications network 50.

Figure 3:
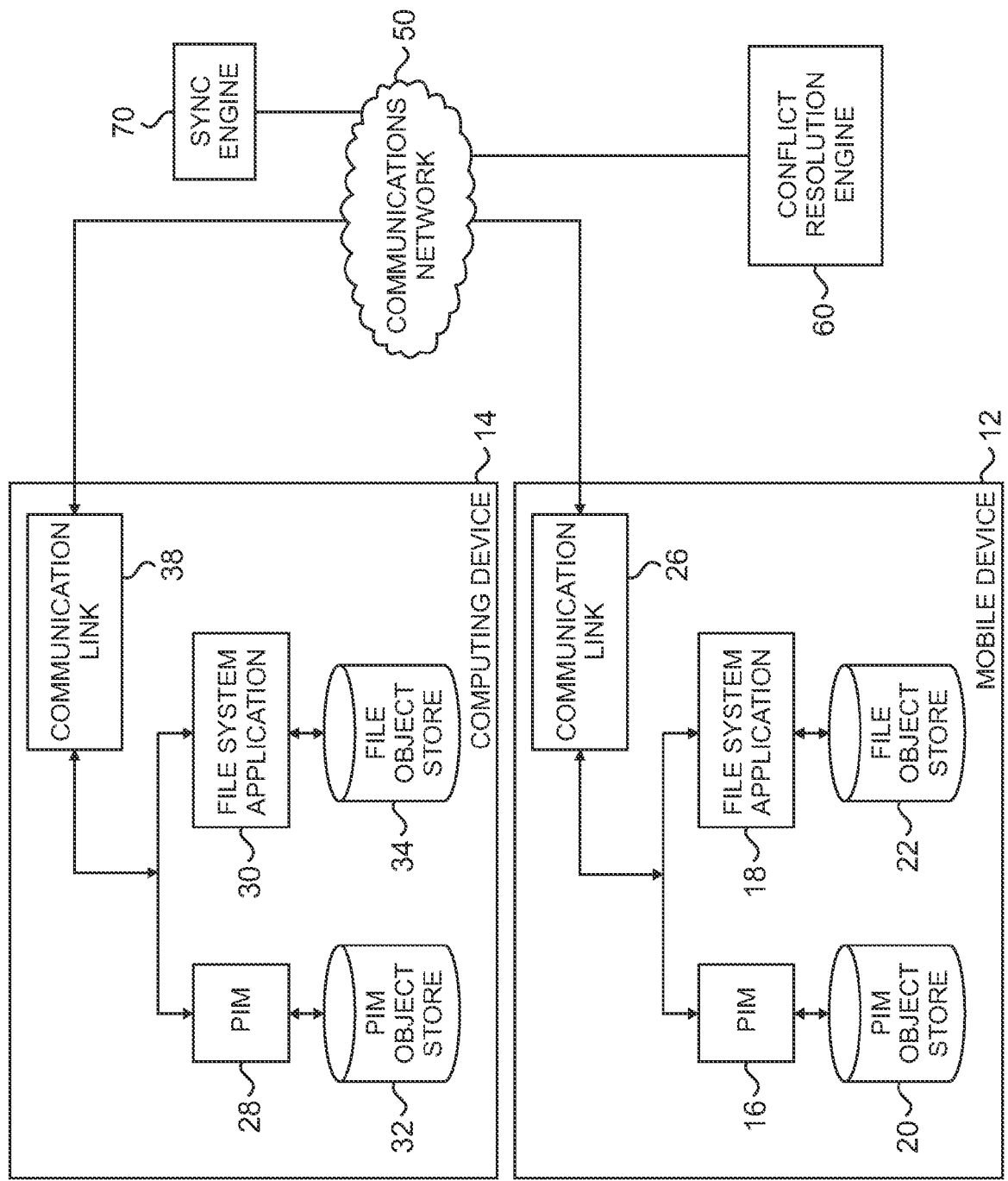
FIG. 3 show another illustrative environment in which data may be synchronized and shared among endpoints that are in communication with one another.

In the example shown in FIG. 2 each of the endpoints includes its own synchronization component. In other implementations the synchronization component may reside external to the endpoints. For instance, FIG. 3 shows an implementation in which mobile device 12 and computing device 14 accesses a synchronization engine or component 70 over communications network 50. In some cases synchronization component 70 may reside on the same server as conflict resolution component 60.

Also shown in FIG. 2 is a conflict resolution component (e.g., engine) 60, which resolves or facilitates resolution of synchronization conflicts. In this example the conflict resolution component 60 resides on a server that is communicatively coupled to the mobile device 12 and computing device 14 over communications network 50. The conflict resolution component 60 is operable to receive synchronization requests from one or more of the synchronization components 24 and 36. The resolution request can include, among other things, identities of the conflicting objects and the instances of those objects that need to be resolved. Upon receipt of such a request, the conflict resolution component can execute a conflict resolution protocol or policy, which specifies and ultimately determines how a conflict is resolved. After a decision is made concerning how the conflict is to be resolved, the conflict resolution component 60 can identify the changes that should be made to one or more of the objects to resolve the conflict. These changes can be included in a resolution response generated by the conflict resolution component 60 and communicated to one or more synchronization components 24 and 36 via communications network 50.

Figure 4:
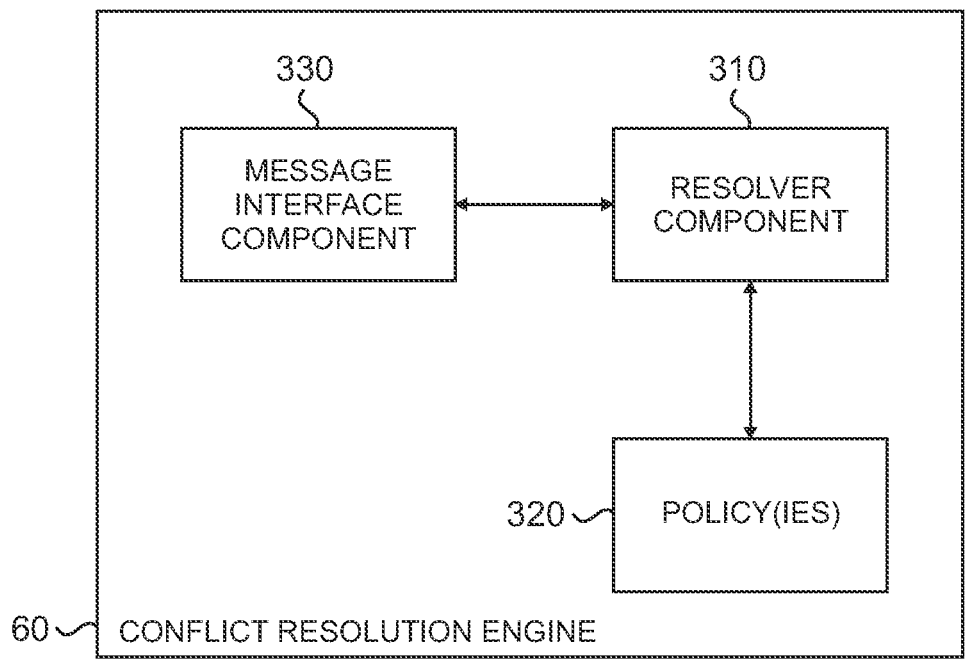
FIG. 4 illustrates one example of a conflict resolution component or engine.

FIG. 4 illustrates one example of a conflict resolution engine or component 60. Conflict resolution component 60 includes a resolver component 310 that resolves conflicts between conflicting objects. The resolver component 310 can process received and/or retrieved data and make a decision concerning how a conflict should be handled. Exemplary input includes the identity of the conflicting objects and the instances of those objects that need to be resolved. Furthermore, the resolver component 310 can acquire rules and RuleSets (described below) from policy component 320. Policy component 320 includes or is able to acquire one or more policies or protocols that can be executed by the resolver component 310 to resolve conflicts. Resolver component 310 is also communicatively coupled to message generation component 330. Message interface component 330 produces a message or response to a resolution request received from the synchronization component. The message or response that indicates what actions (e.g., add, delete, modify . . . ) need to be taken to resolve the conflict on a synchronization components 24 and 36. Message generation component 330 employs data provided by the resolver component 310 as well as other data provided to or retrieved by the synchronization component(s) to generate the message.

The conflict resolution policy implemented by conflict resolution component 60 is based on one or more rules. Each rule includes three items. The first item is a list of pre-actions that are to be performed on specific data within an object before the comparison condition within the rule is executed. The second item is a condition which determines whether the rule should run. The third item is a list of actions to be performed on the data within the object in the event that the condition in the second item determines that the rule should be run.

The three items that make up a rule can be illustrated with an example. For instance, one object may be a person record, which contains fields for a first name, last name and phone number. One particular instance, instance A, of a person record may be ('John', 'Doe', "212-1223-4567) and another instance, instance B, of this person record may be ('John Doe', "+1-212-1223-4567). A rule that is to be applied to this person record may be as follows: If one instance contains the full name field inside the first name field and the other instance is properly separated into first and last name fields, accept the instance containing the separated fields.

For this object a pre-action that may need to be performed involves breaking up the name field in instance B into two separate fields (a first name field and a last name field) so that they can be compared to their corresponding fields in instance A. In this case the condition in item 2 of the rule is satisfied since in instance A the full name is located inside the first name field and in the other instance the full name is separated into first and last name fields. Accordingly the action specified in item 3 of the rule is performed. That is, the action that is performed selects the field ('John', 'Doe') from instance B and uses it to replace the corresponding field in instance A.

Figure 5:
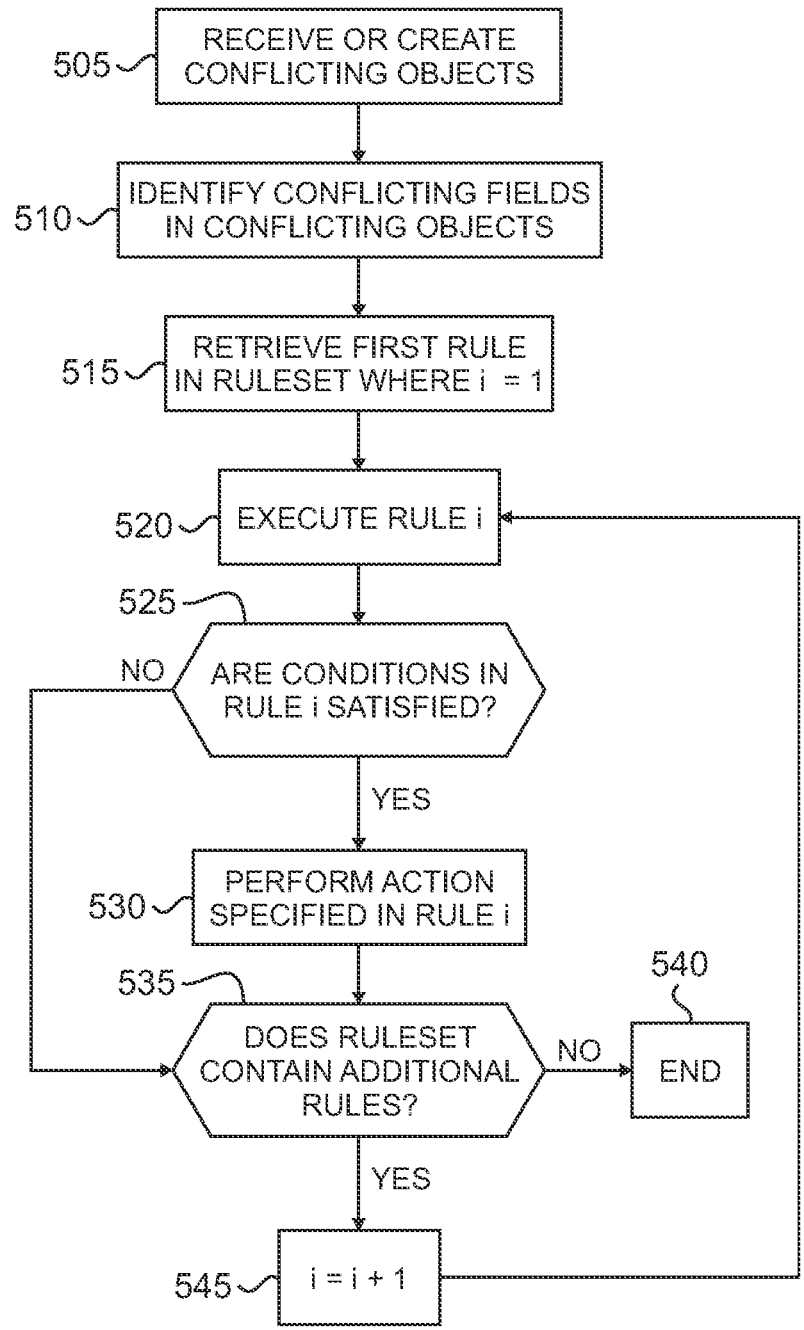
FIG. 5 is a flowchart illustrating one example of a method for implementing a conflict resolution policy.

As previously mentioned, a conflict resolution policy consists of a series of rules. The ordered set of such rules may be referred to as a RuleSet. FIG. 5 is a flowchart illustrating one example of a generalized method for implementing a RuleSet. The method begins at step 505 when the conflict resolution component 60 receives an object to be resolved among each instance of a data item, depending on whether the synchronization component provides the conflict resolution component 60 with the data items or simply the conflicting objects within the data items. Next, at step 510 the conflict resolution component 60 flags or otherwise identifies the fields in the object for which a conflict among different instances is not resolved. The method continues with step 515, in which conflict resolution component 60 retrieves rule (i) in the RuleSet, with (i) initialized to i=1. Conflict resolution component 60 then begins to execute the rule in step 520, during which any pre-actions specified by rule (i) are performed. After performing the pre-actions on the object, the conflict resolution component 60 determines at decision step 525 if the condition(s) specified in rule (i) are satisfied. If so, the method continues to step 530, where the action or actions specified in the rule are performed on the object, after which the method proceeds to step 535. On the other hand, if the condition(s) specified in rule (i) are not satisfied, the method proceeds directly to step 535. At decision step 535, it is determined if there are more rules in the RuleSet that need to be executed. If not, the method terminates at step 540. If more rules are present in the RuleSet, the method proceeds to step 545 and (i) is incremented by one, after which the method returns to step 525. The process continues until the last rule has been executed.

The synchronization methodology described above will be illustrated with the following example.

Assume the data to be synchronized consists of Person records. Each Person has a first name, last name, and phone number.

Assume there are two RuleSet objects:
1) PhoneResolutionRules. Consists of two rules:
  a) If the two numbers are the same except for one side containing hyphens ('-') in the middle, accept the hyphenated version.
  b) If the two numbers are the same except for one side containing the international access code, accept the fuller version.
2) NameResolutionRules. Consists of two rules:
  a) If one side contains the full name inside the first name field, and the other side is separated properly into first name and last name, accept the separated version.
  b) If the two sides have the same first name and the different last names, put both last names in the result (Merge result).

Given Person object A ('John', 'Doe', '212-123-4567') and Person object B ('John Doe', ", '+1-212-123-4567'), the flow of the automatic resolution process is shown in FIG. 6.

The method illustrated above may serve as a design framework for developers when they create RuleSet objects. RuleSet objects that are created in this manner may be loaded dynamically using the synchronization process' runtime. The data objects and other necessary information may be dynamically linked during runtime. The RuleSet name and other custom parameters can be placed in a configuration file, thereby making the design framework very customizable.

In some cases where a RuleSet may not be able to resolve a particular conflict, a possible implementation for a rule will be to present the user with the conflicting data and ask him or her to resolve it manually. A rule may apply machine learning to the manual user selections so that future conflicts of a similar nature can be automatically resolved without user intervention. For example, if a conflict arises between data items that comprise a contact residing in a personalized address book on WINDOWS LIVE and EXCHANGE, a rule may refrain from suggesting a solution to conflict, and let the user manually chose the solution. After a few consistent user selections to resolve such a conflict, the rule may subsequently choose a solution based on the user's previous manual selections.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A synchronization methodology comprising the following computer implemented acts:
  detecting a synchronization conflict between at least a first and second data item resident on at least a first and second component;
  identifying at least first and second conflicting objects in the first and second data items, respectively;
  identifying at least one pair of corresponding fields in the first and second conflicting objects that contain conflicting data;
  retrieving a rule set that includes one or more rules for resolving conflicts among data items, wherein each of the one or more rules is decomposed into at least one pre-action that is to be performed on the data in one of the pairs of the corresponding fields in the first and second conflicting objects, at least one condition that is to be applied to the first and second conflicting objects, and at least one action that is to be performed on data in the pair of corresponding fields in the first and second conflicting objects if the at least one condition is satisfied, the action being performed after the pre-action;
  sequentially executing each rule in the rule set by determining if the condition is satisfied, and, if the condition is satisfied, performing the action on the data in the pair of corresponding fields in the first and second conflicting objects to thereby apply a change to at least one of the first and second conflicting objects.

2. The synchronization methodology of claim 1 wherein the first and second components reside on different endpoint devices.

3. The synchronization methodology of claim 1 wherein the rule set is retrieved from a configuration file.

4. The synchronization methodology of claim 3 wherein sequential execution of each rule is performed during a synchronization component runtime.

5. The synchronization methodology of claim 1 further comprising:
  generating a conflict resolution request that includes at least the first and second conflicting objects in the first and second data items, respectively;
  forwarding the conflict resolution request from a synchronization component to a conflict resolution component, wherein the conflict resolution component sequentially executes each rule.

6. The synchronization methodology of claim 1 wherein the action that is performed includes selecting the data from one of the fields in the pair of corresponding fields and replacing it with the data in the other field in the pair of corresponding fields.

7. The synchronization methodology of claim 1 further comprising:
  sequentially executing each rule in the rule set by further performing the pre-action on the data in the pair of corresponding fields in the first and second conflicting objects.

8. A conflict resolution system comprising the following computer-implemented components:
  an interface component that receives a request to resolve a conflict between at least first and second data objects respectively associated with first and second data items, said first and second data items being respectively resident on at least a first and second component;
  a resolver component that resolves conflicts identified in the request based on a conflict resolution policy;
  a policy component for maintaining the conflict resolution policy executed by the resolver component, wherein the policy component maintains a rule set that includes one or more rules for resolving conflicts among data items, wherein each of the one or more rules is decomposed into at least one pre-action that is to be performed on data in one of the pairs of corresponding fields in the first and second data objects, at least one condition that is to be applied to the first and second data objects, and at least one action that is to be performed on the data in the pair of corresponding fields in the first and second conflicting objects if the at least one condition is satisfied; and wherein the resolver component resolves conflicts by sequentially executing each rule in the rule set by performing the pre-action on the data in the pair of corresponding fields in the first and second conflicting objects, determining if the condition is satisfied, and, if the condition is satisfied, performing the action on the data in the pair of corresponding fields in the first and second conflicting objects to thereby apply a change to at least one of the first and second conflicting objects.

9. The conflict resolution system of claim 8 wherein the interface component includes a message generation component that generates a response to the request.

10. The conflict resolution system of claim 8 further comprising a configuration file in which the rule set is located.

11. The conflict resolution system of claim 8 further comprising a synchronization component that synchronizes the first and second data items and generates the conflict resolution request provided to the interface component.

12. The conflict resolution system of claim 11 wherein the resolver component is configured to resolve conflicts during runtime of the synchronization component.

13. The conflict resolution system of claim 8 wherein the first and second components are application programs.

14. The conflict resolution system of claim 13 wherein the application programs reside on different endpoint devices.

* * * * *